W. O. KUHN.
DRIVING MECHANISM FOR MOTOR VEHICLES.
APPLICATION FILED JULY 28, 1915.
1,194,040.
Patented Aug. 8, 1916.
2 SHEETS—SHEET 1.
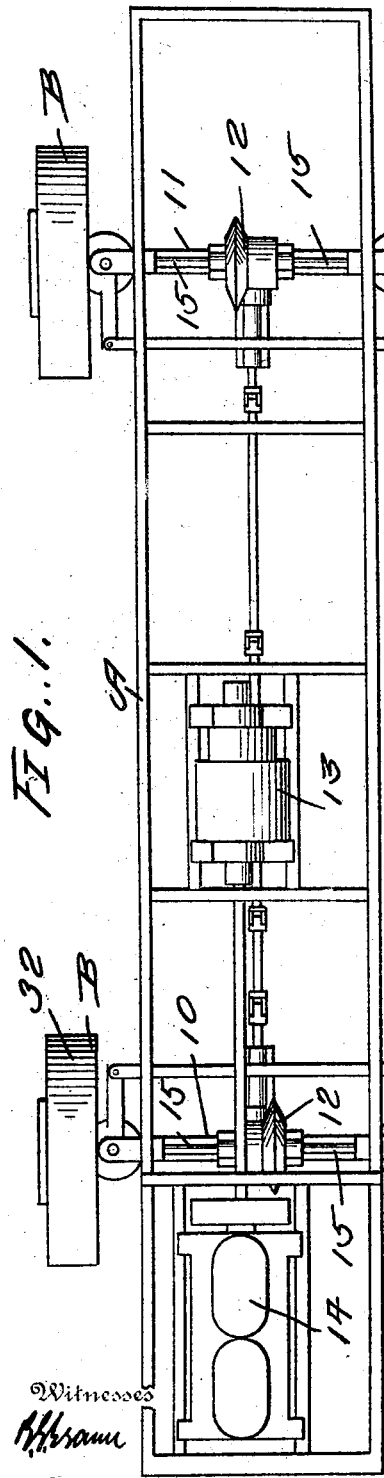
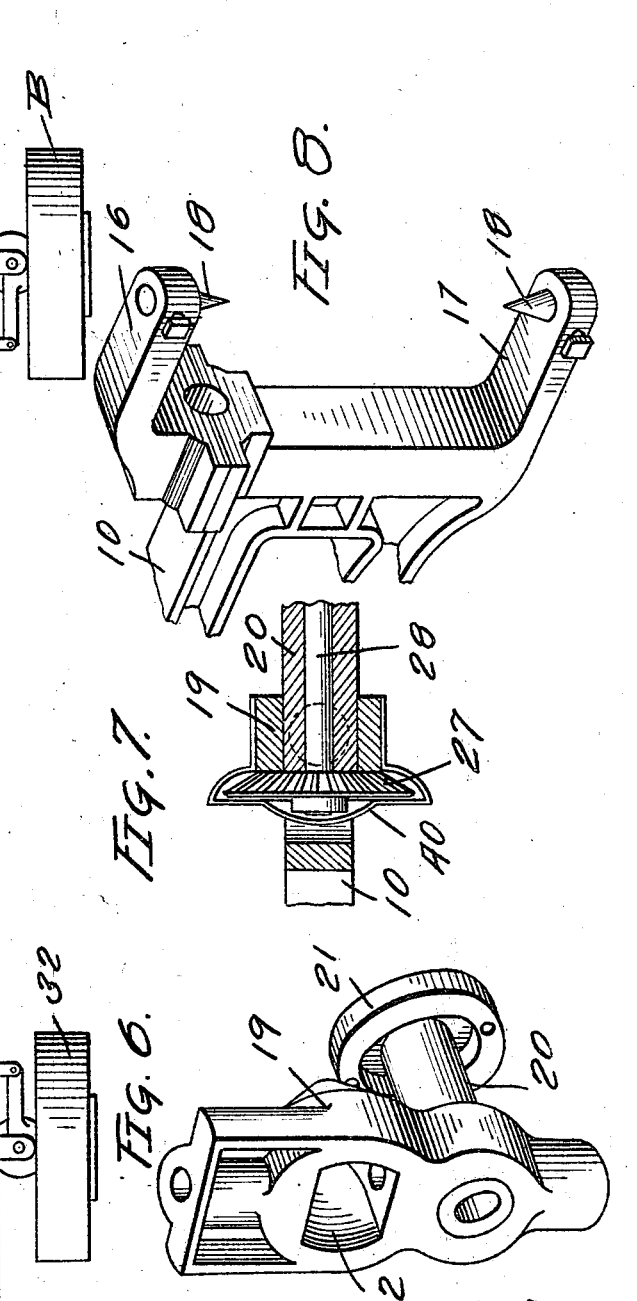

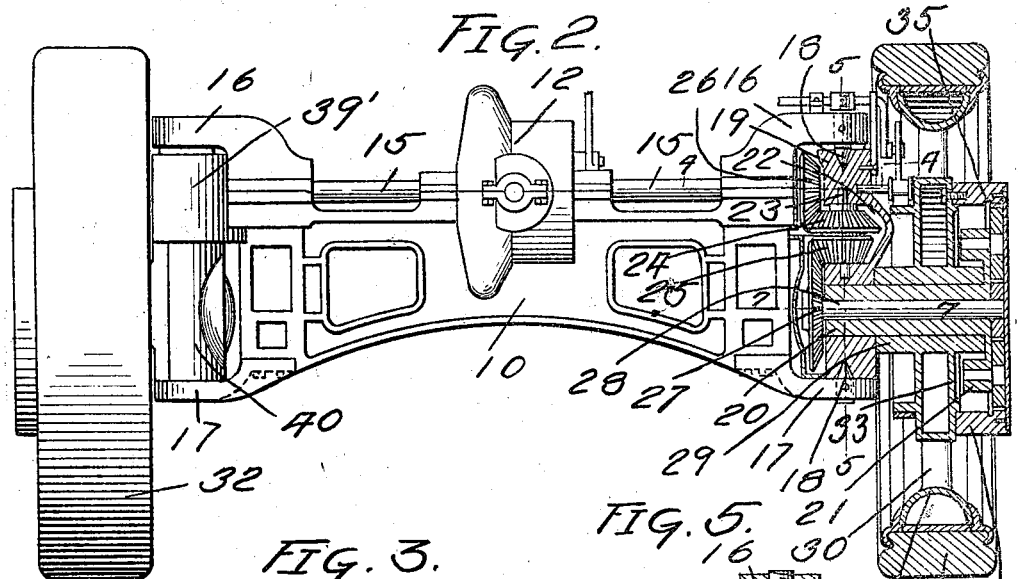
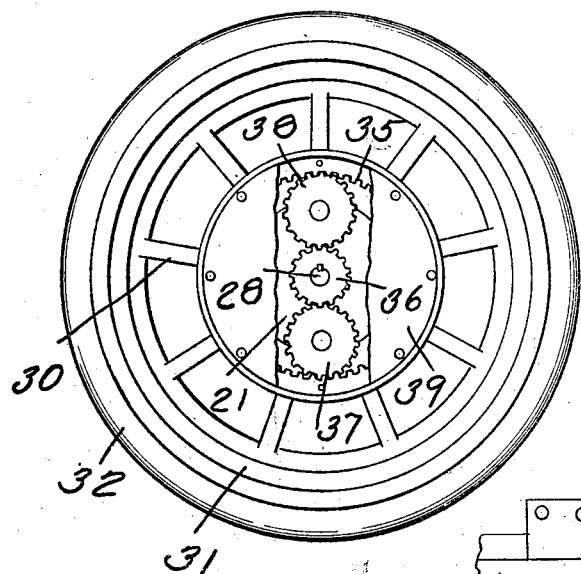
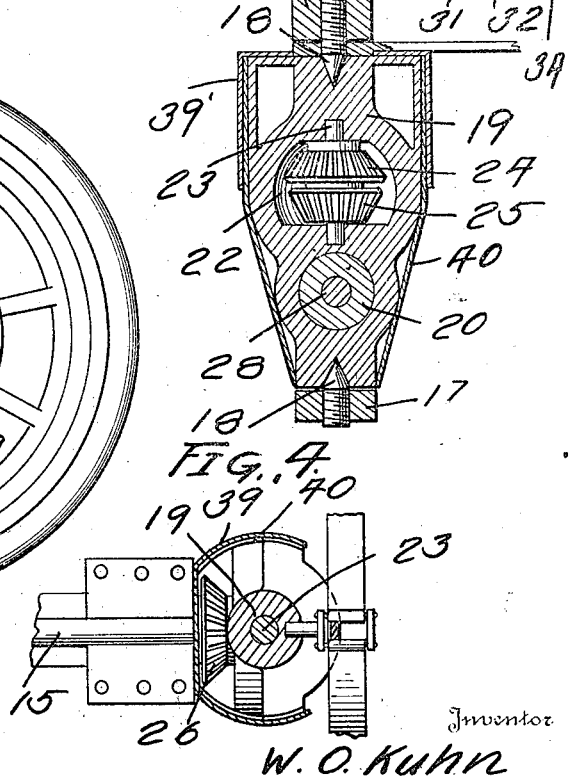

UNITED STATES PATENT OFFICE.

WILLIAM O. KUHN, OF WEBER, WASHINGTON.

DRIVING MECHANISM FOR MOTOR-VEHICLES.

1,194,040.   Specification of Letters Patent.   Patented Aug. 8, 1916.

Application filed July 28, 1915. Serial No. 42,398.

*To all whom it may concern:*

Be it known that I, WILLIAM O. KUHN, a citizen of the United States, residing at Weber, in the county of Grant, State of Washington, have invented certain new and useful Improvements in Driving Mechanism for Motor-Vehicles; and I do hereby declare the following to be a full, clear, and exact description of the invention, such as will enable others skilled in the art to which it appertains to make and use the same.

This invention relates to driving mechanism for motor vehicles.

It is my purpose to provide an improved driving mechanism for motor vehicles through the instrumentality of which the power of the motor will be applied simultaneously and directly to each of the four wheels of the vehicle.

It is my further purpose to provide a driving mechanism for motor vehicles of the type named embodying an improved construction whereby same may be applied to a motor vehicle in which steering movement is imparted to both the front and rear wheels, the driving mechanism being so arranged that the steering movement of the various wheels in no way interferes with the proper operation thereof.

It is also my purpose to provide a driving mechanism of the type named which will be economical with respect to power, eliminate wear with resultant prolongation of life, and be highly efficient in use.

With the above and other purposes in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a motor vehicle embodying the invention, various parts of the vehicle being omitted to more clearly disclose the driving mechanism; Fig. 2, a view in elevation looking at the rear side of the front axle, the view being partly in section to more clearly disclose the driving mechanism carried by the axle; Fig. 3, a side view of what is shown in Fig. 2 with the cover plate of the wheel broken away to disclose the gears that directly coöperate with the wheel; Fig. 4, a section on the line 4—4 of Fig. 2; Fig. 5, a section on the line 5—5 of Fig. 2; Fig. 6, a perspective view of the swiveled yoke or knuckle upon which the traction wheel is rotatably supported; Fig. 7, a section on the line 7—7 of Fig. 2, and Fig. 8, a perspective view of one end of the axle shown in Fig. 2.

Referring to the drawings A indicates the frame of a motor vehicle which is supported upon front and rear axles 10 and 11 and secured to the ends of these axles respectively in a manner to permit steering movement to be imparted thereto through the medium of a suitable steering gear or traction wheels B. Mounted upon each of the axles 10 and 11 is a differential 12 and each differential is connected to a transmission 13 suitably mounted upon the frame A. This transmission 13 is in turn connected to the motor 14 of the vehicle. Each differential 12 is connected to the related traction wheels B by means of shaft sections 15 which are rotatably mounted upon the related axle. As the connections between each shaft section 15 and its related wheel are identical only the connection between one of the shaft sections carried by the front axle and the related wheel will be described in detail. The end of the axle 10 is so formed as to produce spaced ears 16 and 17 and adjustably mounted in these ears respectively are alined cone bearings 18. Rotatably mounted on the bearings 18 is a yoke or knuckle 19 which carries a stub shaft 20 disposed at right angles to the axis of rotation thereof. The outer end of the shaft 20 is provided with a circumscribing flange 21 for a purpose that will presently appear. Rotatably mounted within a recess 22 formed in the yoke 19 is a shaft 23 and fixed upon this shaft for rotation therewith are oppositely disposed beveled gears 24 and 25. The gear 24 meshes with a beveled gear 26 fixed on the outer end of the shaft section 15, while the beveled gear 25 meshes with a beveled gear 27 fixed on the inner end of a shaft 28 rotatably mounted in the shaft 20 and extending longitudinally through the latter.

Rotatably mounted upon the shaft 20 is the traction wheel B which includes the hub 29 and spokes 30. Attached to the free ends of the spokes 30 is a rim 31 which carries a suitable tire 32. The inner ends of the spokes 30 are connected by circular web 33 and secured against this web is a ring 34 provided with internal gear teeth 35. Fixed on the outer end of the shaft 28 is a gear 36 which meshes with gears 37 and 38 rotatably mounted on the flange 21, said gears 37 and 38 also meshing with the gear teeth 35 of the ring 34. The outer end of the ring 34 is closed by a disk 39 and said disk in conjunction with the web 33 and the ring 34 forming an oil chamber whereby proper lubrication will be supplied to the journals of the gears 37 and 38 and also to the shaft 28 and 29.

The gears 24 and 26 are protected by a cover 39' secured to the axle 10, while the gears 25 and 27 are protected by a cover 40 secured to the yoke 19 and working within the cover 39'.

From the foregoing construction it will be obvious that the power is applied directly to the wheel and that the swinging of the wheel in steering will in no way interfere with the driving mechanism.

While I have illustrated and described one form of carrying the invention into practice it will be obvious that various changes in the details of construction and in the arrangement of parts may be resorted to without departing from the scope of the invention as set forth in the appended claim.

What is claimed is:—

The combination with an axle, of a knuckle pivoted to the axle and provided with a recess and including a stub axle, a circumscribing flange on the outer end of the stub axle, a wheel rotatable on the stub axle, an internal gear ring secured to the wheel, a plurality of gears rotatably mounted on said flange and meshing with said gear ring, a shaft rotatable in the stub axle, a gear fixed on the outer end of said shaft and meshing with the gears carried by the flange, a gear fixed on the inner end of said shaft, a second shaft rotatable on the axle, a gear fixed on the end of the second shaft, a third shaft rotatably mounted in the recess of the knuckle, and gears fixed on the third shaft meshing respectively with a gear on the second shaft and with the gear on the inner end of the first shaft.

In testimony whereof, I affix my signature, in the presence of two witnesses.

WILLIAM O. KUHN.

Witnesses:
 FRANK J. KOLMAN,
 C. TOUSEY TAYLOR.